US012024010B2

(12) United States Patent
Stinner et al.

(10) Patent No.: US 12,024,010 B2
(45) Date of Patent: Jul. 2, 2024

(54) SELF-PROPELLED EARTH WORKING MACHINE INCLUDING COMBINED HEAT EXCHANGER COOLING AND ENGINE COMPARTMENT VENTILATION

(71) Applicant: Wirtgen GmbH, Windhagen (DE)

(72) Inventors: Tobias Stinner, Nister (DE); Viktor Stremel, Neunkirchen-Seelscheid (DE); Axel Mahlberg, Hennef (DE); Rolf David Pancho Yanza, Bonn (DE)

(73) Assignee: Wirtgen GmbH, Windhagen (DE)

( * ) Notice: Subject to any disclaimer, the term of this patent is extended or adjusted under 35 U.S.C. 154(b) by 206 days.

(21) Appl. No.: 17/699,819

(22) Filed: Mar. 21, 2022

(65) Prior Publication Data
US 2022/0314785 A1   Oct. 6, 2022

(30) Foreign Application Priority Data

Mar. 30, 2021   (DE) .................... 10 2021 108 113.0

(51) Int. Cl.
| | |
|---|---|
| *B60K 11/04* | (2006.01) |
| *E01C 23/088* | (2006.01) |
| *E01C 23/12* | (2006.01) |

(52) U.S. Cl.
CPC ............ *B60K 11/04* (2013.01); *E01C 23/088* (2013.01); *E01C 23/127* (2013.01)

(58) Field of Classification Search
CPC ..... E01C 23/088; E01C 23/127; B60K 11/04; F01P 11/10
See application file for complete search history.

(56) References Cited

U.S. PATENT DOCUMENTS

| 10,100,712 B2 | 10/2018 | Baldus et al. |
|---|---|---|
| 10,294,850 B2 | 5/2019 | Shue et al. |

(Continued)

FOREIGN PATENT DOCUMENTS

| DE | 7438494 U | 10/1975 |
|---|---|---|
| DE | 102005024444 A1 | 12/2005 |

(Continued)

OTHER PUBLICATIONS

German Office Action for corresponding patent application No. 102021108113.0, dated Nov. 2, 2021, 5 pages (not prior art).

*Primary Examiner* — Carib A Oquendo
(74) *Attorney, Agent, or Firm* — Lucian Wayne Beavers; Patterson Intellectual Property Law, PC

(57) ABSTRACT

A self-propelled earth working machine includes a traveling gear, a machine frame supported by the traveling gear, a power source accommodated on the machine frame for providing power for a travel operation and/or for an earth working operation, a working apparatus accommodated on the machine frame for earth working, and a cooling device for cooling a functional device of the earth working machine. The cooling device includes at least one heat exchanger system for transferring heat from a cooling medium to air, and a ventilator system, which is on the one hand designed and situated to produce a cooling air flow passing the heat exchanger system and which is on the other hand designed and situated to produce in the area of the power source a ventilation air flow flowing away from the power source. The heat exchanger system and a ventilation volume, in which the ventilation air flow flows away from the power source, are situated on the suction side of the ventilator system, the ventilation volume being situated downstream of the heat exchanger system relative to the cooling air flow, so that the ventilation air flow generated by (Continued)

the ventilator system meets the cooling air flow downstream of the heat exchanger system and upstream of the ventilator system.

19 Claims, 4 Drawing Sheets

(56) References Cited

U.S. PATENT DOCUMENTS

| | | | | |
|---|---|---|---|---|
| 2013/0220574 | A1* | 8/2013 | Zeolla | B60K 11/08 |
| | | | | 165/42 |
| 2015/0361866 | A1 | 12/2015 | Baldus et al. | |
| 2016/0305307 | A1 | 10/2016 | Shue et al. | |
| 2020/0047584 | A1* | 2/2020 | Krolnik | B60K 11/04 |
| 2022/0194215 | A1* | 6/2022 | Springer | B60K 11/085 |

FOREIGN PATENT DOCUMENTS

| | | | |
|---|---|---|---|
| DE | 102005031474 | A1 | 3/2006 |
| DE | 102014008749 | A1 | 12/2015 |
| DE | 102019205431 | A1 | 10/2020 |
| EP | 3081421 | B1 | 7/2019 |

* cited by examiner

SELF-PROPELLED EARTH WORKING MACHINE INCLUDING COMBINED HEAT EXCHANGER COOLING AND ENGINE COMPARTMENT VENTILATION

RELATED APPLICATIONS

This application claims priority to German application DE 10 2021 108 113.0 filed Mar. 30, 2021, which is incorporated herein by reference.

BACKGROUND OF THE INVENTION

Field of the Invention

The present invention relates to a self-propelled earth working machine, such as for example a road milling machine, in particular a cold milling machine, a surface miner or a stabilizer. The earth working machine comprises:
- a traveling gear, by which the earth working machine stands on a subsurface in rollable fashion, and
- a machine frame supported by the traveling gear,
- a power source accommodated on the machine frame for providing power, which is usable for a travel operation and/or for an earth working operation of the earth working machine,
- a working apparatus for earth working accommodated on the machine frame,
- a cooling device for cooling a functional device of the earth working machine, the cooling device comprising:
- at least one heat exchanger system, comprising at least one heat exchanger, which is designed to transfer heat from a cooling medium to air, and
- a ventilator system, which is on the one hand designed and situated to generate a cooling air flow passing the heat exchanger system and which is on the other hand designed and situated to generate, in the area of the power source, a ventilation air flow flowing away from the power source.

Description of the Prior Art

Such an earth working machine in the form of a road milling machine is known from DE 10 2014 008 749 A1 (U.S. Pat. No. 10,100,712). From this document it is known in particular to situate both a combustion engine as the power source as well as the cooling device mentioned at the outset between an operator's platform and the rear end of a cold milling machine. The known heat exchanger system comprises two heat exchangers, which belong to different cooling circuits. In a first cooling circuit, a cooling medium circulates between a heat exchanger and the combustion engine and gives off heat at the heat exchanger, which the cooling medium previously absorbed at the combustion engine. In a second cooling circuit, a hydraulic oil circulates as the cooling medium giving off heat in the heat exchanger, which hydraulic oil serves to operate hydraulic motors of the travel drive. The cooling air flows passing the individual heat exchangers are strictly separated from one another by separating walls, since due to the operating characteristic of the known cold milling machine there exists a thermal load on the cooling medium of the combustion engine on the one hand and of the hydraulic oil on the other hand, which is complementary to a certain extent. In a travel operation without earth working, there is only little thermal load on the combustion engine and its cooling medium, while there is a great load on the hydraulic oil of the hydraulic motors forming the travel drive. In an earth working operation at low travel speeds, compared to the aforementioned travel operation, but at a high drive output of the milling drum of the cold milling machine, there is only little thermal load on the hydraulic oil, while there is a great thermal load on the combustion engine and its cooling medium. An operation at a high drive output of the milling drum and at the same time a high travel speed practically never occurs in reality. This also applies to specific embodiments of the earth working machine of the present application, which preferably have a hydraulic motor driven propulsion and a milling drum as a working apparatus.

DE 10 2014 008 749 A1 (U.S. Pat. No. 10,100,712) teaches to use the ventilator system both for moving cooling air through the heat exchangers as well as for venting air from an engine compartment. The combustion engine is accommodated in the engine compartment.

In particular, DE 10 2014 008 749 A1 (U.S. Pat. No. 10,100,712) teaches in one specific embodiment to situate the heat exchangers and the combustion engine on the suction side of the ventilator system, and to move air vented from the area of the combustion engine, mixed with likewise aspirated fresh air, by suction through the heat exchangers. DE 10 2014 008 749 A1 (U.S. Pat. No. 10,100,712) also teaches in other specific embodiments to situate the heat exchangers and the combustion engine on the pressure side of the ventilator system, and to move air aspirated by the ventilator system by pressing it through the heat exchangers and past the combustion engine.

The first mentioned technical teaching has the disadvantage that the air moved through the heat exchanger has a higher temperature than the aspirated pure fresh air due to the admixed heated air that was vented from the area of the combustion engine, which reduces the heat dissipation from cooling medium to air at the heat exchanger and thus the heat exchanger's efficiency.

The second mentioned technical teaching has the one disadvantage that ventilators operated so as to push the air are less efficient than ventilators operated with the same power in sucking fashion and has the further disadvantage that at the pressure side particularly the air moved toward the combustion engine in pushing fashion flows along nearly uncontrollable and unpredictable flow routes and exits at arbitrary often even disadvantageous locations at the earth working machine into the outer surroundings.

A further earth working machine in the form of a drilling rig is known from EP 3 081 421 B1 (U.S. Pat. No. 10,294,850), in which a combustion engine as a heat source and a heat exchanger system are situated on the suction side of the ventilator system, specifically consecutively in the air flow generated by the ventilator system. Consequently, the ventilator system conveys air heated by the combustion engine through the heat exchanger system, which results in the disadvantages described above. Due to the series arrangement, the combustion engine is in an environment of substantial underpressure relative to the atmosphere during the entire ventilator operation. As a result, an above-average amount of dirt is conveyed from the dusty construction site environment of the known earth working machine to the combustion engine almost continuously. The ventilator system known from EP 3 081 421 B1 (U.S. Pat. No. 10,294,850) is situated at an angle with respect to a longitudinal axis of the ventilator duct that supports it so as to be able to achieve the greatest possible ventilator surface at a specified duct cross section.

SUMMARY OF THE DISCLOSURE

It is therefore the objective of the present invention to improve the earth working machine mentioned at the outset by removing the aforementioned disadvantages.

The present invention achieves this objective in an earth working machine mentioned at the outset in that the heat exchanger system and a ventilation volume, in which the ventilation air flow flows away from the power source, are situated on the suction side of the ventilator system, the ventilation volume being situated downstream of the heat exchanger system relative to the cooling air flow, so that the ventilation air flow generated by the ventilator system meets the cooling air flow downstream of the heat exchanger system and upstream of the ventilator system.

By using the arrangement of heat exchanger system, ventilator system and ventilation volume according to the invention, the ventilator system is on the one hand operated by suction, which is not only the most effective operating mode of a ventilator system, but which also ensures a possibility for determining where the air heated by the heat exchanger system and/or by the power source may be exhausted away from the earth working machine.

On the other hand, the ventilator air flow vented from the ventilation volume of the power source and from the power source, whose temperature inevitably increases in operation, meets the cooling air flow only after the latter has passed the heat exchanger system. This achieves the result that the coolest air flow possible passes the heat exchanger system, which airflow, due to the consequently higher temperature difference between the cooling medium flowing through the heat exchanger system and the passing air flow, ensures a higher convective heat dissipation from the heat exchanger system than would be the case in the case of an admixture of a heated ventilation air flow.

The power source is also efficiently ventilated since the area around the power source, that is, the ventilation volume, which at least borders the power source and preferably surrounds the power source at least partially, does not have air flowing around it that was previously heated by a heat transfer from the heat exchanger system to the air.

Hence, it is possible to operate the heat exchanger system effectively and effectively to ventilate the power source, which always heats up in operation.

Another advantage of the invention is the fact that only a portion of the total air quantity conveyed by the ventilator system is aspirated from the ventilation volume near the power source, which reduces the underpressure in the surroundings of the power source and thus the entry of dirt into these surroundings compared to the related art according to EP 3 081 421 B1 (U.S. Pat. No. 10,294,850).

The point of origin of both the cooling air flow as well as the ventilation air flow is preferably the external environment and thus the surrounding atmosphere of the earth working machine, without one of the air flows absorbing heat convectively from another functional device prior to reaching the heat exchanger system or the power source. At most, air aspirated by the ventilator system flows through a cover of the heat exchanger system and/or a cover of the power source from the external surroundings toward the heat exchanger system or toward the power source.

The power source is preferably a combustion engine, the combustion engine in turn being preferably a diesel combustion engine. Diesel combustion engines may be operated in stationary fashion with a good efficiency factor and low emissions. It shall not be excluded, however, that an Otto engine or another kind of thermal or electrical motor is used as power source or that the power source comprises one or multiple fuel cells. The power source may be in particular a combustion engine including turbocharger. The power source is, as it were, a power plant incorporated in the earth working machine, which provides the power required for operating the earth working machine. In the case of a thermal engine as power source, the earth working machine may comprise in a manner known per se one or multiple power converters, which convert the power provided in one form by the power source into another form of provided power. Thus it is possible for example to drive the working apparatus for earth working mechanically by a mechanical output member of the power source, such as a crankshaft, by connecting gears in between. It is likewise possible, for example via a secondary output shaft of such a gear, in particular of a pump transfer gear, to operate a hydraulic pump, which converts the power provided by the power source into potential energy in the form of an increased pressure level of a hydraulic oil. Furthermore, power of the power source may be converted via a generator from mechanical power into electrical power.

According to a more generalized teaching of the present invention, instead of the power source, a heat source may be situated separately from the heat exchanger system, and preferably at a distance from the latter, leading away from which the ventilator system generates a ventilation air flow in operation in order to ventilate the heat source. What was said in the present application about the power source also applies to the heat source, which may be for example an electrical energy storage system or a gear unit.

The working apparatus for earth working is preferably an earth-removing working apparatus. This is preferably understood to be a rotating working apparatus having geometrically defined bits, such as for example a milling drum, and/or having geometrically undefined bits, such as for example a so-called "grinding drum" for a specific texturing of earth surfaces.

In the present context, a "passing" of the cooling air flow past the heat exchanger system denotes any kind of flow of the cooling air flow past the heat exchanger system while the cooling air flow is convectively removing heat from the heat exchanger system. When passing the heat exchanger system, the cooling airflow may flow along a heat transfer surface of the heat exchanger system in the same direction or in the opposite direction relative to the direction of flow of a cooling medium flowing on the other side of the heat transfer surface. The heat exchanger system is preferably a cross-flow heat exchanger system, in which the cooling air flow flows crosswise with respect to the direction of flow of the cooling medium flowing through the heat exchanger system. The heat exchanger system may have cooling ducts carrying the cooling air flow.

In principle, it is conceivable that the cooling air flow on the one hand and the ventilation air flow on the other hand are aspirated separately from each other by the ventilator system and after passing through the ventilator system are exhausted into the external surroundings. A consistent separation of the two air flows, however, requires the installation of corresponding flow ducts, which represents an increased expenditure and results in a complicated flow guidance, if the cooling air flow is always to be able to flow through the entire heat exchanger system. An increased expenditure and increased complexity increase the susceptibility to failure. It is therefore preferable to provide a mixing volume between the heat exchanger system and the ventilator system, in which the cooling air flow and the ventilation air flow mix. At the point in time at which the cooling air flow and the ventilation air flow mix, they have as convective air flows already fulfilled their task of heat dissipation and may now, without having to worry about impairments of efficiency factors, be jointly and in a mixed state conveyed as exhaust air through the ventilator system on its pressure side and be preferably exhausted into the external surroundings.

It is conceivable to filter the exhaust air upstream or downstream of the ventilator system, that is, to situate an air filter in the flow path of the exhaust air through which the exhaust air flows. Since normally only air from the external surroundings is aspirated and conveyed so as to pass the heat exchanger as a cooling air flow and only air from the area of the power source is exhausted, which is normally replaced by air flowing in from the external surroundings, the degree of contamination of the two air flows is limited, so that no filtering of the air flows is necessary for protecting the already robust ventilator system or for cleaning the exhaust air.

In order to facilitate the assembly of the earth working machine, the earth working machine, in particular its cooling device, may include a preassembled air flow assembly, the air flow assembly including the ventilator system, the heat exchanger system and a frame supporting the ventilator system and the heat exchanger system. Thus, the air flow assembly may be simply preassembled at a separate assembly location and mounted as a preassembled assembly on the earth working machine, in particular on its machine frame.

The frame may be a truss frame having a plurality of trusses, on which the ventilator system and the heat exchanger system are mounted. A skeletal truss frame has a comparatively low weight. In order to set defined flow conditions, the frame may include a housing section enclosing the mixing volume at least partially. To this end, the frame may have a frame skin and for this purpose may be constructed and/or formed at least in sections from sheet metal and/or plastic faces. In this manner, it is possible to ensure that the ventilator system actually aspirates only or predominantly the cooling air flow passing the heat exchanger system and the ventilation air flow drawn away from the power source, but no false air from other areas of the earth working machine. It is thus possible to prevent the ventilator system from aspirating air from areas of the earth working machine that do not require convective cooling and/or ventilation.

So that the cooling air flow and the ventilation air flow meet upstream of the ventilator system, but downstream of the heat exchanger system and are preferably able to mix, it is advantageous if the ventilator system is situated at a distance from the heat exchanger system. Space is utilized particularly well if the ventilator system and the heat exchanger system are rotationally displaced relative to each other about a pivot axis. In that case, different areas of the ventilator system on the one hand and of the heat exchanger system on the other hand have different distances from one another. But the flow paths from the heat exchanger system to the ventilator system are short. Additionally or alternatively, the ventilator system and the heat exchanger system may be situated so as to be displaced in translatory fashion along a displacement axis. The translatory displacement of the heat exchanger system and the ventilator system, however, normally requires more installation space than a rotational displacement.

For the advantageous reduction of the required installation space, the ventilator system is preferably an essentially plane ventilator system. "Plane" is here not to be understood strictly mathematically, but rather in such a way that the ventilator system has substantially greater dimensions in two spatial directions that are orthogonal to each other than in a third spatial direction that is orthogonal to the mentioned spatial directions, which particularly preferably is the direction of flow of the ventilator system, along which the exhaust air flows through the ventilator system. An axis of rotation at least of one ventilator of the ventilator system runs along the third spatial direction, or preferably, if the ventilator system comprises multiple ventilators, all axes of rotation of the multiple ventilators run along the third spatial direction. Alternatively or preferably additionally, the heat exchanger system is also an essentially plane heat exchanger system. This also means that the heat exchanger system respectively has a substantially greater dimension along two spatial directions that are orthogonal to each other than in a third spatial direction that is orthogonal to the two spatial directions, which is preferably a direction of flow, along which the cooling air flows through the heat exchanger system that is preferably developed as a cross-flow heat exchanger system.

If both the heat exchanger system as well as the ventilator system are respectively developed as plane systems, then the pivot axis, about which the two systems are rotationally displaced relative to each other, preferably runs in parallel to each plane of the two systems.

The flow-through area of the heat exchanger system is preferably greater than the flow-through area of the ventilator system, so that as great as possible a heat transfer area may be provided at the heat exchanger system. The flow-through area of a ventilator of the ventilator system is preferably circular or annular, so that it is able to approach a rotating ventilator wheel as tightly as possible. If the ventilator system has multiple ventilators, preferably every flow-through area of a ventilator is circular or annular.

For the best possible utilization of the installation space provided for mounting the heat exchanger system, the flow-through area of the heat exchanger system is preferably rectangular.

If the ventilator system and the heat exchanger system are rotationally displaced relative to each other about the pivot axis, the rotational displacement angle is preferably between 65° and 115°, particularly preferably between 80° and 100°. This angular offset of the two systems relative to each other by a displacement angle in an angular range around a right angle nevertheless allows for a heat exchanger system and a ventilator system having each comparatively large flow-through areas to be situated over a comparatively small base area. The aforementioned air flow assembly may then have a roughly prismatic shape, for example having a mixing volume having an essentially triangular base shape, it being possible for the mixing volume to be formed along one side by the ventilator system, along a second side by the heat exchanger system and along a third side by a wall of the frame forming the housing section.

It is possible for the ventilator system and the heat exchanger system to be situated in a spatially very compact manner, in particular as a very compact air flow assembly, on the earth working machine, if the ventilation air flow flows crosswise with the respect to the direction of flow of the cooling air flow passing the heat exchanger system and/or crosswise with respect to an exhaust air flow flowing through the ventilator system toward the mixing volume. In the case of the roughly prismatic air flow assembly mentioned above by way of example, it is thus possible for two air flows, preferably the cooling air flow and the exhaust air flow, to flow through the lateral surface of the roughly prismatic air flow assembly and for an air flow, preferably the ventilation air flow, to flow through an end face of the roughly prismatic air flow assembly.

For example, the housing section of the frame enclosing the mixing volume at least partially may have a through-hole situated at a distance both from the heat exchanger system as well as from the ventilator system, through which the ventilation air flow is able to flow. As was explained previously, the housing section comprising the through-hole is preferably part of an end wall of a prismatic air flow assembly.

In principle, this through-hole may have unchangeable cross section, whose shape and/or size and/or position may be optimized by respective experiments. For adapting the ventilation of the power source, for example as a function of its operating state, it is also conceivable, however, to design a cross-sectional area of the through-hole, through which the ventilation air flow is able to flow, to be variable in order to change the ventilation air quantity flowing in the ventilation air flow per unit of time (i.e the air flow rate) under given operating conditions. For this purpose, the through-hole may have for example a diaphragm device, which makes it possible to change by actuator a covering of the through-hole by a diaphragm component by displacing the diaphragm component relative to a component forming the through-hole. If the through-hole is developed on a housing section of the frame of the air flow assembly, then preferably the diaphragm device, in particular the diaphragm component movable relative to the through-hole, is also accommodated on the frame, in particular on the housing section of the frame, of the air flow assembly.

In the operation of the earth working machine, the cooling air quantity required per unit of time is normally greater, often even markedly greater, than the ventilation air quantity required in the same unit of time. Thus, a major part of the air quantity conveyed by the ventilator system flows through the heat exchanger system. The ventilation air flow serves mostly only to ventilate the power source in order to prevent a heat accumulation in the surroundings of the latter. The cooling airflow, by contrast, normally serves specifically to remove a quantity of heat in order to maintain, during the operation of the earth working machine, a thermal equilibrium in the at least one functional device cooled by the heat exchanger system.

The heat exchanger system may include a plurality of heat exchangers, which are preferably components of different cooling circuits and/or cooling cycles for cooling functional devices on the earth working machine. Then it is advantageously possible convectively to cool the respective cooling medium of different cooling circuits and/or cooling cycles at one and the same location. For example, one cooling circuit may run between a heat exchanger and the power source, one cooling circuit may run between a heat exchanger and a hydraulic oil tank, or hydraulic oil as the cooling medium giving off heat may flow through a heat exchanger as oil cooler. In one cooling cycle, a heat exchanger may serve as a gas-gas charge-air cooler of a turbocharger. In one cooling circuit, a heat exchanger may be part of a gas-liquid charge-air cooler of a turbocharger. A heat exchanger in a cooling circuit may also be a transmission oil cooler. Different cooling media may thus flow through different heat exchangers. Two or more heat exchangers may also have the same cooling medium flowing through them, which however circulates in separate cooling circuits and/or circulates in separate cooling cycles.

The ventilator system may likewise include a plurality of ventilators in order to produce, if required, air flows of different strengths in different areas of the ventilator system and in particular of the mixing volume. This may be advantageous if a heat exchanger of a plurality of heat exchangers requires a higher convective cooling capacity than other heat exchangers of the heat exchanger system. The ventilators of the ventilator system are preferably controllable separately of one another, so that it is possible simultaneously to generate quantitatively different air flows with the aid of the individual ventilators.

The earth working machine preferably has an operators platform, from which the operation of the earth working machine may be controlled, regardless of whether it is a predominant travel operation without earth working or a predominant working operation with only little travel operation. The heat exchanger system and the ventilator system may then be situated between the operator's platform and the front longitudinal end of the earth working machine, so that the advantageous cooling device described above may also be used on compact milling machines, whose working apparatus in the form of a milling drum is situated in the area of the rear end of the earth working machine, in particular below and/or behind the operator's platform.

In principle, it is conceivable to route a ventilation line carrying the ventilation airflow from the power source to the cooling device. Such a ventilation line then defines a portion of the ventilation volume. This normally entails, however, an increase of the flow resistance for the ventilation air flow and an additional installation expenditure. The heat exchanger system and the ventilator system of the power source are therefore preferably situated directly next to each other. Particularly preferably, no further functional device is located between the power source and the cooling device, in particular the air flow assembly, so that the ventilator system is able to aspirate air directly from the ventilation volume as ventilation air flow. According to this preferred development, the ventilation volume may border on the one hand on the power source without the formation of a duct-shaped line and may even surround the latter at least partially, and the ventilation volume may on the other hand border on the through-hole to the mixing volume.

To prevent the machine operator from being adversely affected on an operator's platform located behind the power source in the forward travel direction, it is preferred that the heat exchanger system is situated closer to one side of the earth working machine in the transverse direction of the machine and that the ventilator system is situated closer to the opposite other side in the transverse direction of the machine. This makes it possible in particular to discharge an exhaust air flow with a flow component in the transverse direction of the machine laterally from the earth working machine. The operator's platform then does not travel through the exhaust air flow in forward travel.

For better observability of the earth work, the operator's platform is preferably offset from the longitudinal center axis of the machine laterally, that is, in the transverse direction of the machine. To avoid polluting the operator's platform with the exhaust air flow, its exhaust location is preferably situated closer to, particularly preferably on the respective side of the two sides of the earth working machine, from which the operator's platform is offset in the opposite direction. In other words, the exhaust location is preferably closer to, in particular on the respective side of the two sides of the earth working machine, from which the operator's platform is further removed.

The systems of ventilator system and heat exchanger system, which are preferably rotationally displaced relative to each other, may form a ridge, the ridge line running likewise preferably in parallel to the longitudinal axis of the machine.

In other words, a pollution of the operator's platform by the operation of the cooling device may be avoided in that the cooling air flow passing the heat exchanger system has a flow component in the transverse direction of the machine and a flow component in the vertical direction of the machine and/or in that an exhaust air flow flowing through the ventilator system has a flow component in the transverse direction of the machine and a flow component in the vertical direction of the machine. Due to the preferred ridge-forming arrangement, described above, of the heat exchanger system and the ventilator system, which may be achieved in particular by the above-described roughly prismatic shape of the air flow assembly, the flow components of the cooling air flow on the one hand and of the exhaust air flow on the other hand, which run in the vertical direction of the machine, are preferably oppositely directed. The flow components in the transverse direction of the machine, by contrast, preferably run in the same direction. The ventilation air flow then preferably flows along the longitudinal axis of the machine into the mixing volume of the cooling device.

For protection against external influences, the heat exchanger system and/or the ventilator system and/or the power source may be covered by a cover. The cover preferably has openings in order to ensure the accessibility of the cooling device and/or of the power source for ambient air.

In the operational state of the earth working machine, a separating device, which delimits a flow path from flow-through openings in the cover to the heat exchanger system in at least one direction transverse to the flow path from the surroundings of the flow path, may abut on a side of the heat exchanger system facing the cover of the heat exchanger system. The separating device preferably extend from the cover to the heat exchanger system. The separating device is preferably a well wall enclosing the flow path, which delimits a well that it surrounds as a flow path or flow duct from the surroundings outside of the well wall. This makes it possible essentially to ensure that upstream of the heat exchanger system only ambient air from the external surroundings of the earth working machine is aspirated as the cooling air flow.

The separating device is preferably connected to the cover for joint movement, so that along with the cover, the separating device is also removed from the cooling device, and so that it is possible to make the cooling device, in particular the heat exchanger system shielded in operation by the separating device against false air, accessible with few maneuvers.

By interposing a sealing device, for example an elastomeric seal encircling the flow path, the separating device may abut on the side of the heat exchanger system facing the cover. The sealing device may be a foamed, an open-cell or closed-cell, or solid structure.

The side of the heat exchanger system facing the cover may include a contact surface, preferably a contact frame surrounding an area through which the cooling air flow is able to flow. In the operational state of the earth working machine, the separating device is then able to abut on the contact surface, preferably with the interposition of the sealing device.

The sealing device may be firmly connected to the heat exchanger system or to the separating device. The sealing device may comprise partial sealing devices, each of which is firmly connected to another structure of heat exchanger device and separating device.

In order to allow for a thorough mixing of the cooling air flow and the ventilation air flow so that there is a homogeneous thermal load on the ventilator system by the exhaust air flowing through it, the mixing volume is preferably greater than the volume occupied by the heat exchanger system. Due to the often complex structure of a heat exchanger system, the volume circumscribed by an enveloping surface wrapped snuggly around the heat exchanger system shall suffice for ascertaining its volume.

Relative to the volume of the heat exchanger system through which the cooling air flow is actually able to flow, the mixing volume preferably has at least twice, particularly preferably at least three times the flow-through volume of the heat exchanger system, so that the cooling air flow is able to mix sufficiently with the ventilation air flow after passing through the heat exchanger system.

For the purpose of cleaning the cooling device, the ventilator system may be designed briefly to reverse, compared to the normal cooling operation, the direction of rotation at least of one ventilator, preferably of all ventilators, for an intermittent cleaning operation. In the cleaning operation, the ventilator system conveys air through the ventilator system into the mixing volume. In the cleaning operation, the ventilator system is thus able to free the heat exchanger system and/or a cover of the heat exchanger system of dust and other contamination, which may settle especially on the side of the heat exchanger system facing the external surroundings of the earth working machine.

A cleaning air flow generated in the cleaning operation, which flows through the ventilator system in the opposite direction as the exhaust air flow, may be used particularly efficiently if, as described above, a closable through-hole is provided between the mixing volume and the ventilation volume. When the through-hole is closed, the entire cleaning air flow may be conducted through the heat exchanger system and clean the latter.

What was said above applies to the normal cooling operation of the cooling device during an earth working operation or a travel operation: the ventilator system generates a cooling air flow and a ventilation air flow, which flow toward the ventilator system, and exhausts the cooling air flow and the ventilation air flow as an exhaust air flow through the ventilator system.

Even though the heat exchanger system preferably is the sole heat transfer device passed by the cooling air flow, and the power source, possibly with the attached additional components such as a turbocharger, is the sole heat source of the ventilation air flow removed from its surroundings by suction, it shall fundamentally not be excluded that the cooling air flow, after it has passed the heat exchanger system, and/or the ventilation air flow, after it has moved sufficiently far away from the power source, passes or pass further heat transfer device and absorbs or absorb heat from the latter. The decisive point is that the further heat transfer device does not heat air that must still pass the heat exchanger system and/or that flows into the surroundings of the power source and there gives off heat to the power source or impedes a heat transfer away from the power source to the air surrounding the power source. For it is the objective of the present invention to make it impossible for additionally heated ambient air to pass the heat exchanger system and for additionally heated ambient air to ventilate the power source. Unavoidable sources of heat, such as the passage of ambient air through a heated cover or casing of the earth working machine, are disregarded for this purpose. Thus, for example, it is possible to situate, downstream of the heat exchanger system relative to the cooling air flow, a further heat transfer device passed by the cooling air flow and/or by the ventilation air flow, for example in the mixing volume. Additionally or alternatively, it is possible to situate, downstream of the power source relative to the ventilation air flow, a further heat transfer device passed by the cooling air flow and/or by the ventilation air flow, for example in the mixing volume, in the through-hole or directly in front of or behind the through-hole. The through-hole may be an inlet diaphragm or an outlet diaphragm for the further heat transfer device. Situating a further heat transfer device in the ventilation air flow does not change the fact that the ventilation air flow, as indicated, meets the cooling air flow downstream of the heat exchanger system and upstream of the ventilator system. The further heat transfer device may be an active heat transfer device through which a heat-dissipating medium flows or it may be a heat-conducting cooling body, which is connected in heat-conducting fashion with a component to be cooled.

BRIEF DESCRIPTION OF THE DRAWINGS

The present invention will be explained in greater detail below with reference to the attached drawings. The figures show.

DETAILED DESCRIPTION

Figure 1:
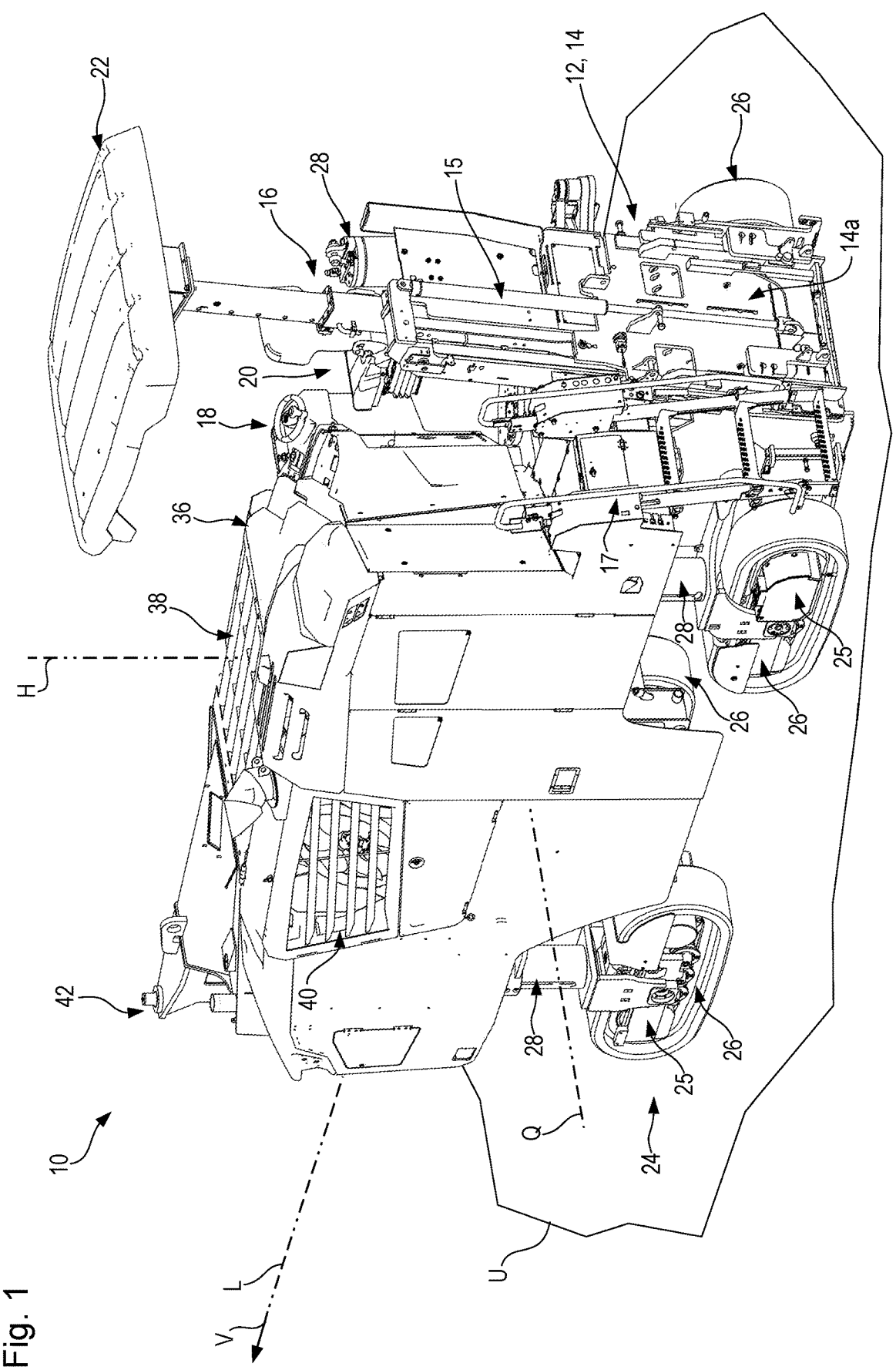
FIG. 1 a perspective view of a compact milling machine at an angle from the rear, FIG. 2 the perspective view of the compact milling machine from FIG. 1 without cover, FIG. 3 a perspective view of the air flow assembly of the cooling device of the compact milling machine of FIGS. 1 and 2, and FIG. 4 a lateral view of the air flow assembly from FIG. 3.
Figure 2:
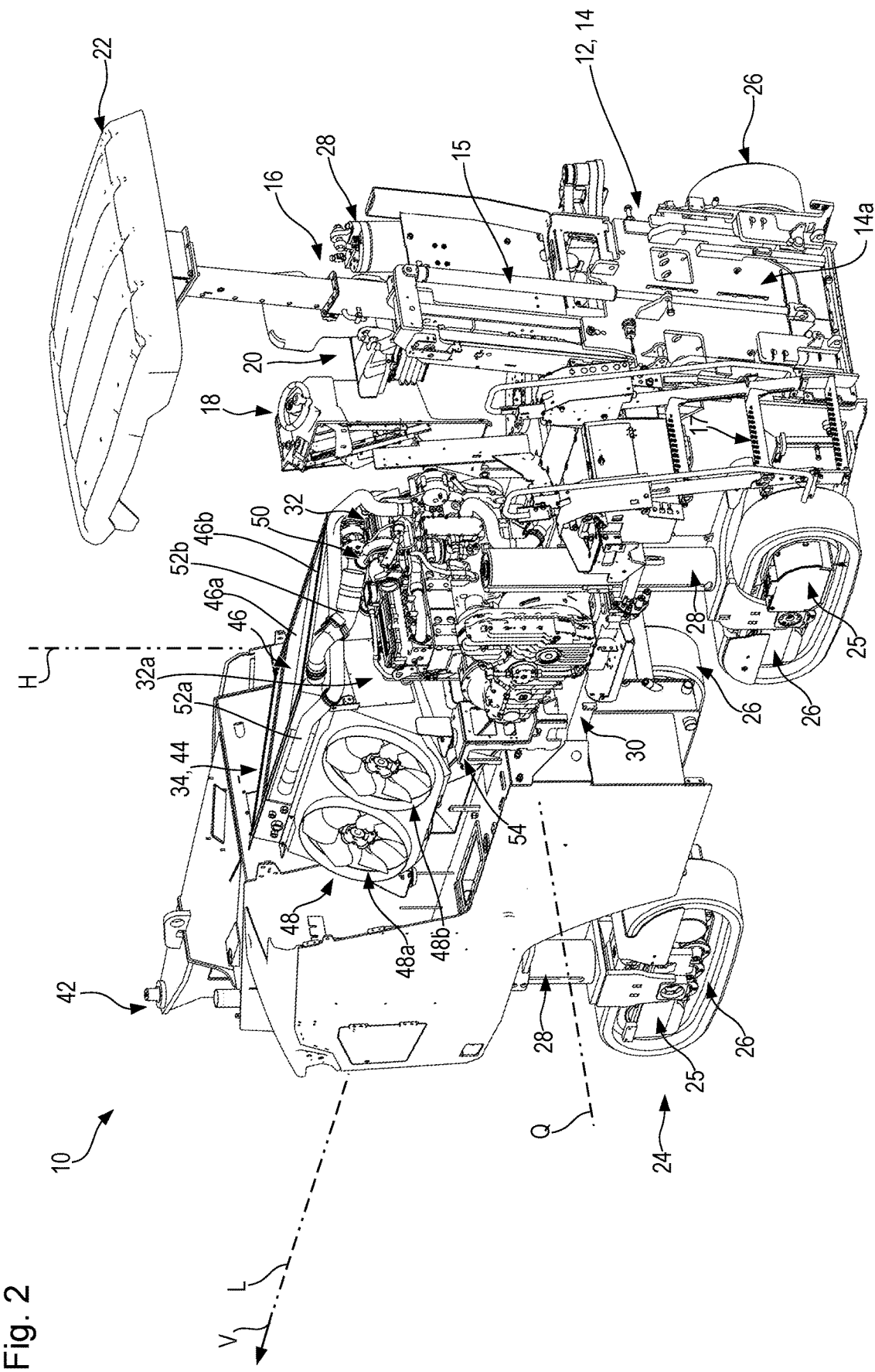

In FIGS. 1 and 2, a cold milling machine in the merely exemplary form of a compact milling machine is shown at an angle from the rear and generally labeled with reference numeral 10. In the concretely illustrated compact milling machine, the working apparatus 12 is located in a milling drum housing 14 in the rear area of cold milling machine 10, approximately below an operator's platform situated asymmetrically offset to the right side of the machine when viewed in the forward travel direction, which is reachable via a ladder 17 at the rear of the machine and from which the operation of cold milling machine 10 may be controlled by a machine operator. At the rear of cold milling machine 10, a scraper shield 14a may be seen, which may be raised and lowered via a piston-cylinder actuator 15 and which forms the rear wall of milling drum housing 14.

For operating a control console 18, the machine operator may sit on a driver's seat 20 and is in so doing protected against precipitation and exposure to sunlight by a protective roof 22 that is displaceable along the vertical machine axis H of the cold milling machine 10.

Cold milling machine 10 stands with its traveling gear 24, which comprises in the illustrated example four crawler track units 26, on a subsurface U illustrated in FIG. 1 only symbolically for the sake of better clarity. Subsurface U may be worked by working apparatus 12 in earth-removing fashion. It is also possible for wheel drive units to be provided instead of crawler track units 26. In any event, an axis of rotation about which the rotating component of the respective drive unit rotates, be it a crawler track or a wheel, runs parallel to the surface of subsurface U, so that the drive units, in this case crawler track units 26, are able to roll on subsurface U in the travel operation of cold milling machine 10.

Using the milling drum accommodated in the milling drum housing 14 in the illustrated example of application as the working apparatus 12, which rotates about an axis of rotation parallel to the transverse direction Q of the machine, material may be removed from the earth that is to be worked. By way of the steerable crawler track units 26, which in the illustrated exemplary embodiment are individually driven by hydraulic motors 25, traveling gear 24 provides the propulsion of cold milling machine 10 and thus the forward motion of working apparatus 12 in particular during earth-removing work.

In a manner that is height-adjustable, that is, displaceable along the vertical axis H of the machine, via lifting columns 28, traveling gear 24 supports a machine frame 30 (see FIG. 2), which supports functional devices of cold milling machine 10. The functional devices include the already mentioned working apparatus 12 together with the milling drum housing 14, the control console 18, the hydraulic motors 25, a diesel combustion engine 32 (see FIG. 2) as power source in the sense of the introduction of the description, a cooling device 34 (see FIG. 2), a cover 36, to mention only a few examples of functional devices. The cooling device 34 may also be referred to as a cooling system 34.

Combustion engine 32 is surrounded by an air-filled ventilation volume 32a, the air of which is heated by combustion engine 32 during its operation due to convection and radiation.

In FIG. 1, an aspiration opening area 38 and an exhaust opening area 40 are developed in cover 36, in which the cover 36 is perforated by opening in order to allow air to pass between an outer side of cover 36 and an opposite inner side. Through the openings of the aspiration opening area 38, cooling device 34 is able to aspirate air from the external surroundings of cold milling machine 10, which it conveys back again through the openings of the exhaust opening area 40 into the external surroundings of cold milling machine 10 after it has passed through cooling device 34. The aspiration occurs and the aspiration opening area 38 is located primarily on the upper side of cover 36 and on its right machine side as viewed in the forward travel direction V. Air is exhausted and the exhaust opening area 40 is located primarily or even entirely on the left machine side, as viewed in the forward travel direction V, which is opposite in the transverse direction Q of the machine.

Merely for the sake of completeness, it shall be noted that on the front side of cold milling machine 10 opposite the rear end of the machine in the longitudinal direction L of the machine, there is a bearing formation 42 supported by machine frame 30 for bearing a material transport device, in particular a conveyor belt, which is not shown, but which is present during an earth working operation.

As may be seen in FIG. 2 when cover 36 is removed, the cooling device 34 in the form of a preassembled air flow assembly 44 comprises a heat exchanger system 46 and a ventilator system 48 having two ventilators 48a and 48b situated side by side by way of example. As a variant of the illustrated example, ventilator system 48 may have only one ventilator or more than two ventilators, and the plurality of ventilators may be arranged in different spatial relations to one another, for example one above the other or diagonally offset with respect to one another.

Heat exchanger system 46 also has a first heat exchanger 46a, through which a cooling medium of combustion engine 32 flows, in order to give off heat in heat exchanger 46a, which it has previously absorbed in combustion engine 32, to the air passing heat exchanger 46a. Heat exchanger system 46 further has a second heat exchanger 46b, which serves as a charge-air cooler for a turbocharger 50 cooperating with combustion engine 32. Thus, while the cooling medium flowing through heat exchanger 46a is liquid, the cooling medium flowing through heat exchanger 46b is gaseous. Heat exchanger system 46 may include more or fewer than the illustrated two heat exchangers 46a and 46b. For example, a further heat exchanger in heat exchanger system 46 may serve as a hydraulic oil cooler and may have hydraulic oil flowing through hydraulic motors 25 flowing through it as a cooling medium. Hydraulic motors 25 may thus also be cooled by the hydraulic oil.

The two heat exchangers 46a and 46b may be arranged in a different spatial relationship toward one another than the one shown, that is, they may be arranged for example next to one another along longitudinal axis L of the machine, instead of one behind the other as illustrated. Instead of a gas-gas charge-air cooler, heat exchanger system 46 may include a gas-liquid heat exchanger as part of a charge-air cooling system, the charge air then transferring heat to a liquid cooling medium, which transfers the heat to the air passing heat exchanger system 46.

FIG. 2 shows the cooling media line 52a conveying the liquid cooling medium of combustion engine 32 to heat exchanger 46a and the second cooling media line 52b conveying the gaseous cooling medium to heat exchanger 46b.

Air flow assembly 44 is supported directly on machine frame 30 via multiple, in the illustrated example altogether four, bearing configurations 54 fixed to the machine frame.

Air flow assembly 44 is explained in more detail below with reference to FIG. 3.

Figure 3:
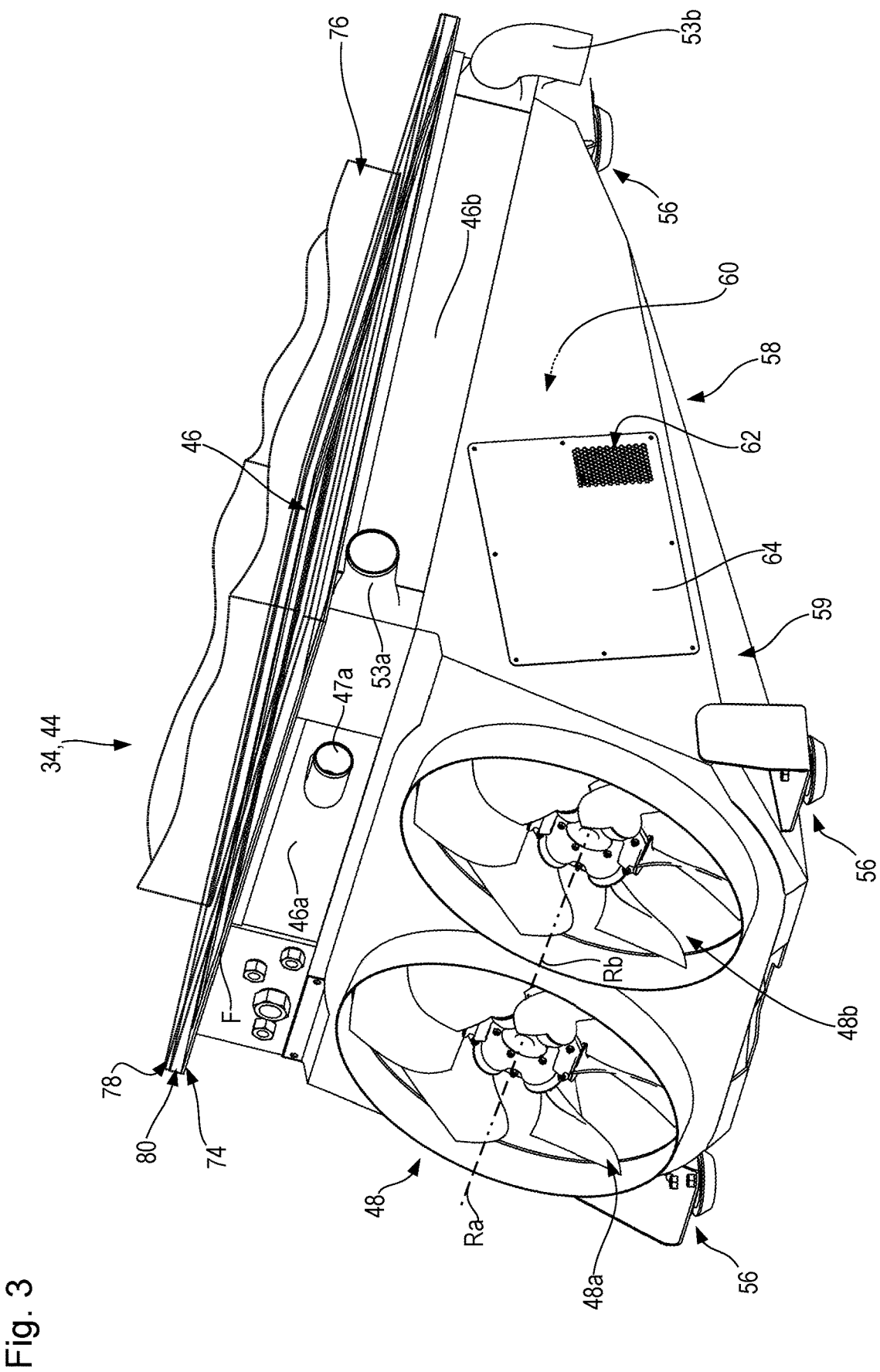

Air flow assembly 44 is secured in position on the bearing configurations 54 of machine frame 30 via altogether four counterpart bearing configurations 56, of which only three are visible in FIG. 3. Counterpart bearing configurations 56 are secured in position on a frame 58 fabricated from a flat material, such as sheet metal for example, for example by welding. Frame 58 supports heat exchanger system 46 and also ventilator system 48. The frame 58 may also be referred to as an assembly frame 58.

FIG. 3 also shows the inlet connection 47a of the cooling medium into heat exchanger 46a. Outlet connection 47b following the passage of the cooling medium through heat exchanger 46a is located on the opposite side of heat exchanger 46a and is not shown in FIG. 3, but rather in FIG. 4.

FIG. 3 also shows the inlet connection 53a of the charge air into heat exchanger 46b and outlet connection 53b of the charge air following its passage through heat exchanger 46b.

With a housing section 59, housing-like frame 58 encloses a mixing volume 60 between heat exchanger system 46 and ventilator system 48. Preassembled air flow assembly 44 has a roughly prismatic shape having an essentially triangular base area. Two lateral surfaces of the triangular prism are formed by heat exchanger system 46 on the one hand and by ventilator system 48 on the other. A third lateral surface forms a lower side of housing section 59 and thus a boundary wall of mixing volume 60. In the end face of housing section 59 of frame 58 facing the observer of FIG. 3 and FIG. 4, a through-hole 62 is formed, through which mixing volume 60 is accessible from outside, that is, as shown in FIG. 2, from the surroundings of combustion engine 32, more precisely from ventilation volume 32a.

Through-hole 62 is developed in a plate 64 mounted on the remaining end face of housing section 59, which covers a passage penetrating the end face of housing section 59 supporting plate 64. In this manner, a passage may be provided quasi as a primary through-hole having a maximum through-hole cross section, which may be adapted by the arrangement of plate 64 with through-hole 62 optimized for the respective case of application with respect to its shape, position and through-hole cross section to the respective case of application of the concrete earth working machine.

In the illustrated exemplary embodiment, through-hole 62 is formed by a plurality of smaller elementary openings, developed for example as bore holes perforating plate 64, which in their totality form through-hole 62. Through-hole 62 is furthermore developed in plate 64 closer to one corner than to the other corners, in order to evacuate a ventilation air flow from an area of ventilation volume 32a around combustion engine 32 that is optimal for this purpose. As a variant of the illustration, through-hole 62 may be formed by a single opening or by a smaller plurality of openings. It may also be developed at a different location in plate 64.

As further shown in FIG. 3, the two ventilators 48a and 48b are essentially identical and are positioned with axes of rotation Ra and Rb in parallel to one another. The ventilator wheels of ventilators 48a and 48b are preferably driven hydraulically or also by electric motor, it being further preferred that each ventilator 48a and 48b is controllable or regulatable independently of the other.

Figure 4:
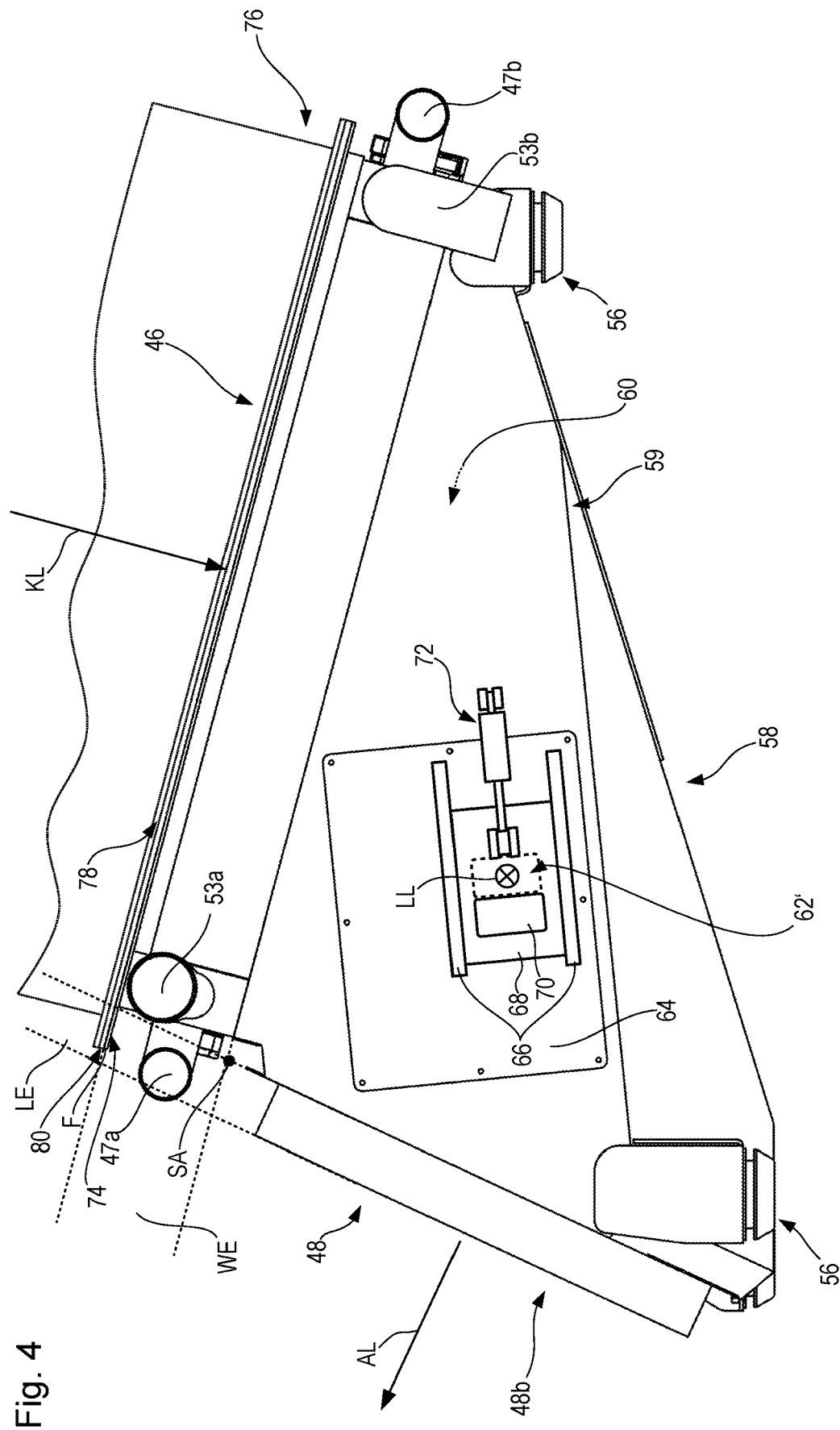

In the top view onto the end face of housing section 59 of frame 58, which is shown in FIG. 4, it may be readily seen that heat exchanger system 46 is situated as a plane heat exchanger system essentially in a heat exchanger plane WE that is orthogonal to the drawing plane of FIG. 4 and that ventilator system 48 is situated as a plane ventilator system essentially in a ventilator plane LE that is likewise orthogonal to the drawing plane of FIG. 4. In the illustrated example, the heat exchanger plane WE and the ventilator plane LE enclose an angle between 100° and 110°. They are pivoted relative to one another with respect to a pivot axis SA running orthogonally with respect to the drawing plane of FIG. 4 and form a ridge F having a ridge line that is parallel to pivot axis SA and to the longitudinal axis L of the machine. In the present example, ridge F is formed by an uppermost edge of a contact frame 74 in the vertical direction H of the machine. Contact frame 74 surrounds an area of heat exchanger system 46 through which cooling air flow KL is able to flow for heat transfer. In the illustrated example, contact frame 74 runs around the flow-through area of heat exchanger system 46 in a fully closed manner.

Heat exchanger plane WE and ventilator plane LE are not infinitely thin planes in the mathematical sense, but are rather component planes, which in their respective direction of thickness have a significantly smaller dimension than in their two extension directions that are orthogonal both with respect to the thickness direction as well as to each other.

In contrast to FIG. 3, the through-hole 62' formed in plate 64 in FIG. 4 is developed as a single contiguous through-hole 62', which is covered, however, by a diaphragm 68 that is displaceable along two rails 66. Diaphragm 68 itself in turn has a diaphragm opening 70 perforating it, which may be brought to overlap with through-hole 62' by shifting diaphragm 68 along rails 66. This makes it possible to change the flow-through cross section of through-hole 62'. Diaphragm 68 is displaceable by an actuator 72 between the closed position shown in FIG. 4, in which diaphragm 68 closes through-hole 62' completely, and an open position, in which diaphragm opening 70 and through-hole 62' overlap completely. It is preferably possible to set intermediate positions. It may also be provided, however, that is only possible either to open through-hole 62' completely or to close it completely by movement of diaphragm 68.

Ventilator system 48 is provided on cooling device 34 or on air flow assembly 44 in such a way that heat exchanger system 46 and through-hole 62 or 62', respectively, are located on the suction side of ventilator system 48. The operation of ventilator system 48 therefore produces an underpressure relative to the ambient atmosphere on the suction side of ventilator 48, which generates a cooling air flow KL from outside through heat exchanger system 46 into mixing volume 60. When through-hole 62 or 62', respectively, are open, the underpressure also generates a ventilation air flow LL, orthogonal to the drawing plane of FIG. 4, from outside through through-hole 62 or 62', respectively, into mixing volume 60, where cooling air flow KL and ventilation air flow LL coming from the area of combustion engine 32 are able to mix. The pressure difference produced by ventilator system 48 between its suction side and its pressure side also effects an 52a AL from mixing volume 60 to the outside through ventilator system 48.

The directions of flow of cooling air flow KL and exhaust air flow AL indicated by the associated arrows, which correspond to the respective direction of thickness of the flow-through system, are preferably situated in one plane. This plane is preferably inclined between 75° and 105° with respect to the longitudinal direction L of the machine, preferably being orthogonal to the latter. The direction of flow of cooling air flow LL through through-hole 62 or 62', respectively, runs transversely to the plane spanned by the directions of flow of cooling air flow KL and of exhaust air flow AL, in particular orthogonally to the latter.

This ensures that no air previously heated by the absorption of heat at heat exchanger system 46 reaches the area of combustion engine 32 and further heats up or prevents the cooling of the surroundings of combustion engine 32. It is likewise ensured that no air heated by combustion engine 32 flows through heat exchanger system 46 and there reduces the efficiency of the convective cooling of the cooling medium flowing through heat exchanger system 46.

FIGS. 3 and 4 show by a dashed line a well wall 76 as a separating device, which extends in the operational state of earth working machine 10 from cover 36 to heat exchanger system 46. Arrow KL in FIG. 4 symbolizes also a flow path, along which cooling air flow KL flows from openings 38 in cover 36 to heat exchanger system 46 and further through the latter. This flow path is located within well wall 76 in a flow duct defined by well wall 76 and delimited from the external surroundings of the latter.

At its longitudinal end facing heat exchanger system 46, well wall 76 preferably has a counterpart contact frame 78, which in the operational state of earth working machine 10 lies across from contact frame 74, having a seal 80 situated in between. The, preferably elastomeric, seal 80 may be firmly connected to contact frame 76 or to well wall 76, in particular to counterpart contact frame 78.

The invention claimed is:

1. A self-propelled earth working machine, comprising:
   a machine frame;
   a traveling gear supporting the machine frame from a subsurface and configured to move the earth working machine across the subsurface in a travelling operation;
   a working apparatus supported from the machine frame and configured to modify the subsurface in an earth working operation;
   a power source supported from the machine frame and configured to provide power for the traveling operation and/or for the earth working operation of the earth working machine; and
   a cooling system configured to cool at least one functional device of the earth working machine, the cooling system including:
      a heat exchanger system including at least one heat exchanger configured to transfer heat from a cooling medium to air;
      a ventilator system configured to produce a cooling air flow passing the heat exchanger system and to produce a ventilation air flow flowing away from the power source in a ventilation volume in a vicinity of the power source; and
      wherein heat exchanger system and the ventilation volume are located on a suction side of the ventilator system, and the ventilation volume is located downstream of the heat exchanger system relative to the cooling air flow, so that the ventilation air flow generated by the ventilator system meets the cooling air flow downstream of the heat exchanger system and upstream of the ventilator system.

2. The self-propelled earth working machine of claim 1, wherein:
   the cooling system includes a mixing volume between the heat exchanger system and the ventilator system, the cooling air flow and the ventilation air flow mixing in the mixing volume.

3. The self-propelled earth working machine of claim 2, further comprising:
   a preassembled air flow assembly including an assembly frame supporting the ventilator system and the heat exchanger system.

4. The self-propelled earth working machine of claim 3, wherein:
   the assembly frame includes a housing section enclosing the mixing volume at least partially.

5. The self-propelled earth working machine of claim 2, wherein:
   the ventilator system and the heat exchanger system are rotationally displaced relative to each other about a pivot axis.

6. The self-propelled earth working machine of claim 2, wherein:
   the ventilator system and the heat exchanger system are displaced relative to each other in a translatory fashion along a displacement axis.

7. The self-propelled earth working machine of claim 2, wherein:
   the ventilator system is an essentially plane ventilator system and/or the heat exchanger system is an essentially plane heat exchanger system.

8. The self-propelled earth working machine of claim 2, wherein:
   the ventilation air flow flows transversely to a direction of flow of the cooling air flow passing the heat exchanger system.

9. The self-propelled earth working machine of claim 2, wherein:
   the ventilation air flow flows transversely to an exhaust air flow flowing through the ventilator system.

10. The self-propelled earth working machine of claim 2, further comprising:
   a housing section enclosing the mixing volume at least partially, the housing section including a through-hole spaced from both the heat exchanger system and the ventilator system, the through-hole being configured such that the ventilation air flow flows through the through-hole.

11. The self-propelled earth working machine of claim 10, wherein:
the through-hole has a cross sectional area through which the ventilation air flow is able to flow, the cross sectional area being variable for varying a flow rate of the ventilation air flow.

12. The self-propelled earth working machine of claim 1, wherein:
the heat exchanger system includes a plurality of heat exchangers which are components of different cooling circuits of the cooling system.

13. The self-propelled earth working machine of claim 1, wherein:
the ventilator system includes a plurality of ventilators.

14. The self-propelled earth working machine of claim 1, further comprising:
an operator's platform, wherein the heat exchanger system and the ventilator system are located between the operator's platform and a front longitudinal end of the earth working machine.

15. The self-propelled earth working machine of claim 1, wherein:
the heat exchanger system and the ventilator system are located directly adjacent to the power source.

16. The self-propelled earth working machine of claim 1, wherein:
the heat exchanger system is located closer to one side of the earth working machine and the ventilator system is located closer to an opposite side of the earth working machine in a transverse direction of the earth working machine.

17. The self-propelled earth working machine of claim 1, wherein:
the cooling air flow passing the heat exchanger system has a flow component in a transverse direction across a width of the machine frame and a flow component in a vertical direction.

18. The self-propelled earth working machine of claim 1, wherein:
an exhaust air flow through the ventilator system has a flow component in a transverse direction across a width of the machine frame and a flow component in a vertical direction.

19. The self-propelled earth working machine of claim 1, further comprising:
a cover covering at least one of the heat exchanger system, the ventilator system and the power source.

* * * * *